(12) United States Patent
Fritz et al.

(10) Patent No.: US 8,425,196 B2
(45) Date of Patent: Apr. 23, 2013

(54) WIND TURBINE BLADES WITH A HARDENED SUBSTRATE CONSTRUCTION

(75) Inventors: Peter James Fritz, Greenville, SC (US); Uli Ramm, Osnabrueck (DE)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/015,870

(22) Filed: Jan. 28, 2011

(65) Prior Publication Data
US 2011/0243751 A1 Oct. 6, 2011

(51) Int. Cl.
*F01D 5/14* (2006.01)

(52) U.S. Cl.
USPC ...................................... 416/229 R; 416/224

(58) Field of Classification Search .................. 416/224, 416/229 R
See application file for complete search history.

(56) References Cited

U.S. PATENT DOCUMENTS

| | | | |
|---|---|---|---|
| 4,895,491 A * | 1/1990 | Cross et al. | 416/224 |
| 5,210,946 A * | 5/1993 | Monroe | 29/889.71 |
| 5,486,096 A * | 1/1996 | Hertel et al. | 416/224 |
| 5,908,522 A * | 6/1999 | Lofstrom et al. | 156/94 |
| 6,800,956 B2 | 10/2004 | Bartlett | |
| 7,255,549 B2 | 8/2007 | Hadley | |
| 7,895,746 B2 * | 3/2011 | Bech et al. | 29/889.7 |
| 7,980,826 B2 * | 7/2011 | Hancock | 416/223 R |
| 8,043,065 B2 * | 10/2011 | Kyriakides | 416/224 |
| 8,057,189 B2 * | 11/2011 | Riahi | 416/224 |
| 2005/0169763 A1 * | 8/2005 | Anning | 416/224 |
| 2007/0025858 A1 * | 2/2007 | Driver et al. | 416/229 R |
| 2007/0036659 A1 * | 2/2007 | Hibbard | 416/233 |
| 2008/0075603 A1 * | 3/2008 | Van Breugel et al. | 416/232 |
| 2009/0116966 A1 * | 5/2009 | Althoff et al. | 416/230 |
| 2010/0028160 A1 * | 2/2010 | Schaeffer et al. | 416/224 |
| 2010/0135817 A1 * | 6/2010 | Wirt et al. | 416/226 |
| 2010/0296940 A1 * | 11/2010 | Zuteck | 416/226 |
| 2011/0142661 A1 * | 6/2011 | Sambamurty | 416/224 |
| 2011/0142663 A1 * | 6/2011 | Gill | 416/226 |

OTHER PUBLICATIONS http://web.archive.org/web/20080220225009/http://pdf.directindustry.com/pdf/master-bond/master-bond-supreme-10aoht-high-thermal-conductivity-epoxy-featuring-both-high-shear-and-high-peel-strength-up-to-400-f/17407-13457.html.*
Document "U" listed above is the website address showing the Technical Data Sheet for Polymer Adhesive Supreme 10AOHT, produced by Master Bond Inc., as disclosed as of Feb. 20, 2008.*

* cited by examiner

*Primary Examiner* — Edward Look
*Assistant Examiner* — Aaron R Eastman
(74) *Attorney, Agent, or Firm* — Dority & Manning, P.A.

(57) ABSTRACT

A wind turbine blade includes an upper shell member and a lower shell member joined at leading and trailing edges of the blade with a bond material. Portions of the bond material are externally exposed. The bond material has surface characteristics of at least one of a Shore D hardness value of greater than about 80 durometer or a Young's modulus stiffness value of greater than about 5 GPa. A protective coating is applied over the upper and lower shell members and exposed portions of the bond material.

18 Claims, 4 Drawing Sheets

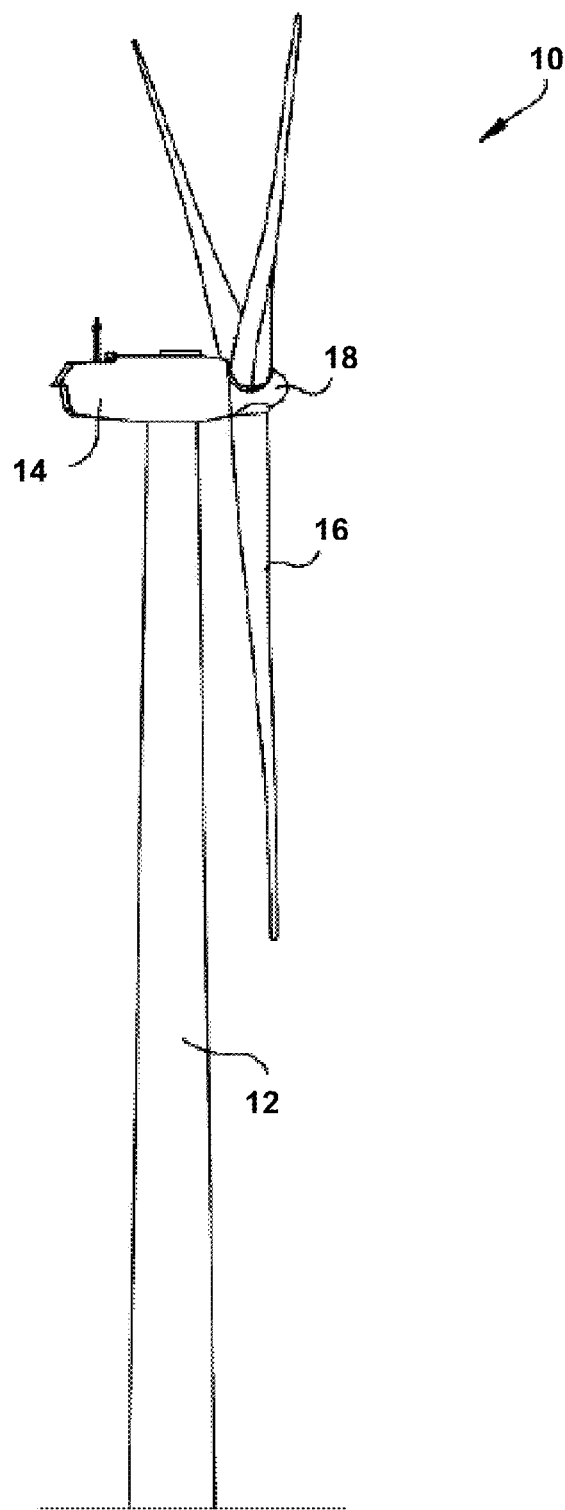
Fig. -1-

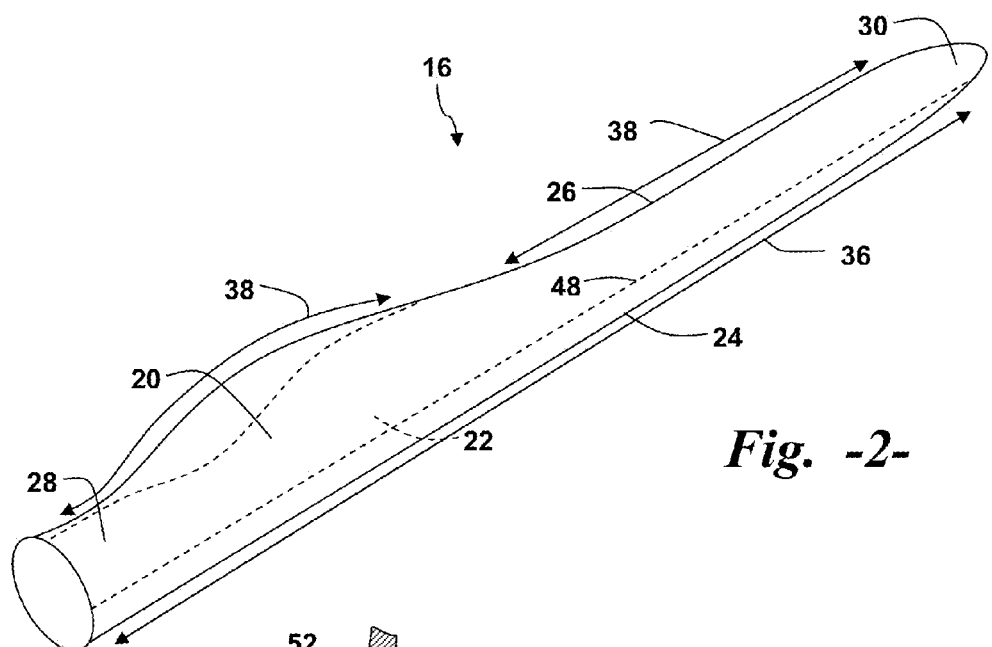
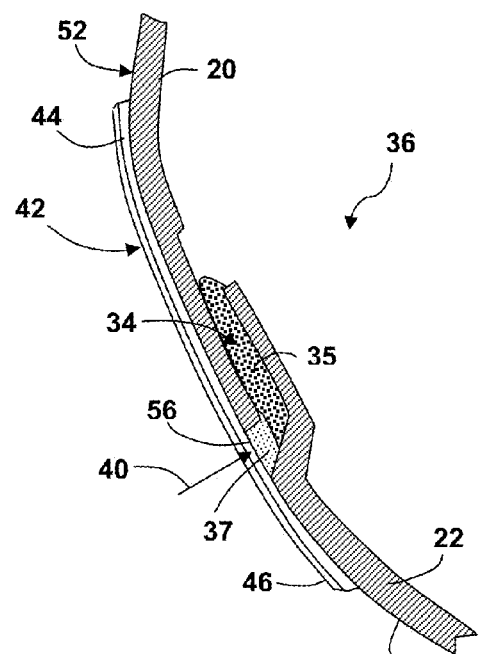

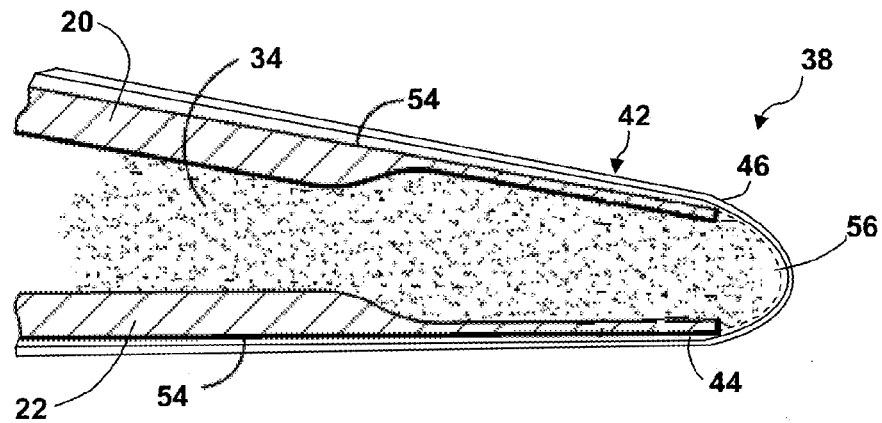
Fig. -4-
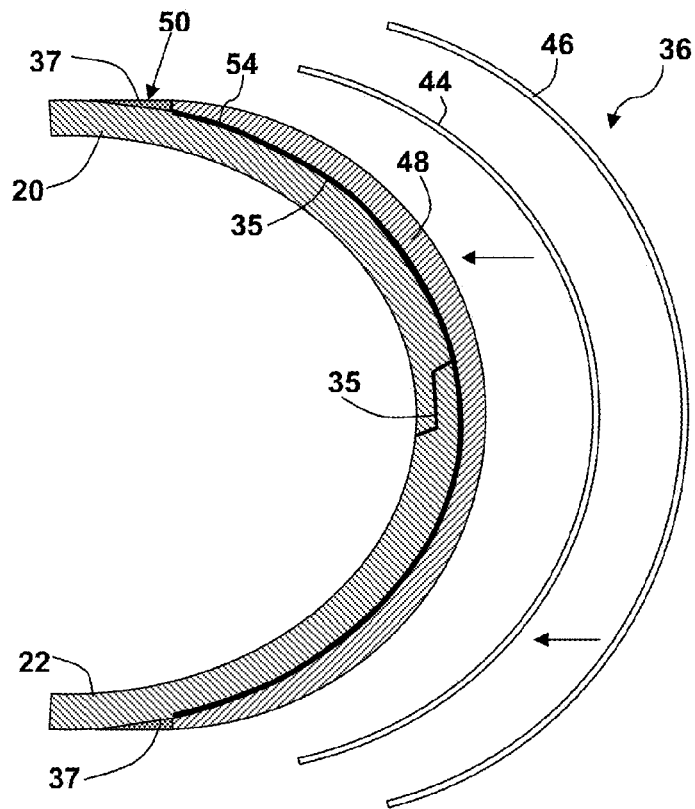
Fig. -5-

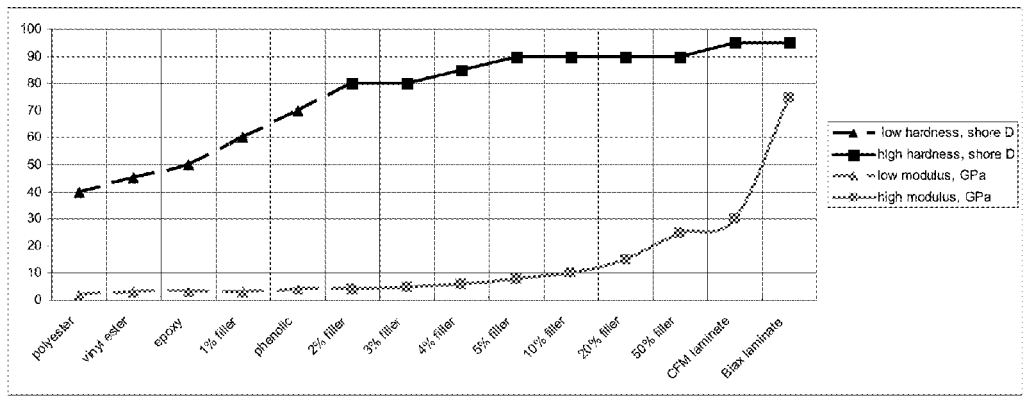
Fig. -6-
| | low modulus, GPa | low hardness, shore D | high modulus, GPa | high hardness, shore D |
|---|---|---|---|---|
| polyester | 2 | 40 | | |
| vinyl ester | 3 | 45 | | |
| epoxy | 3.5 | 50 | | |
| 1% filler | 3 | 60 | | |
| phenolic | 4 | 70 | | |
| 2% filler | 4 | 80 | 4 | 80 |
| 3% filler | | | 5 | 80 |
| 4% filler | | | 6 | 85 |
| 5% filler | | | 8 | 90 |
| 10% filler | | | 10 | 90 |
| 20% filler | | | 15 | 90 |
| 50% filler | | | 25 | 90 |
| CFM laminate | | | 30 | 95 |
| Biax laminate | | | 75 | 95 |
| UD laminate | | | 400 | 95 |
Fig. -7-

WIND TURBINE BLADES WITH A HARDENED SUBSTRATE CONSTRUCTION

FIELD OF THE INVENTION

The present invention relates generally to the field of wind turbines, and more particularly to turbine blades having an improved leading edge configuration.

BACKGROUND OF THE INVENTION

Turbine blades are the primary elements of wind turbines for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The turbine blades typically consist of an upper (suction side) shell member and a lower (pressure side) shell member that are bonded together at bond lines along the trailing and leading edges of the blade. The bond lines are generally formed by applying a suitable bonding paste or compound along the bond line between the shell members. In some instances, a bond cap may be applied along the leading edge as well, and a bond paste or filler is used to blend the cap with the shell members. Typical bonding or adhesive materials include epoxies, acrylics, polyesters, vinyl esters, and urethanes.

It is a conventional practice to apply one or more coatings to the external substrate surfaces of the blade, for example a coating of paint or gelcoat. These coatings serve to protect the underlying substrate, provide a low friction surface to flowing air over the blade, and smooth out surface irregularities. The coatings are applied to all external surfaces of the blade, including over the exposed bonding and blending materials.

Inspection of blades in the field has revealed premature failure of the coatings in the areas that overlie the exposed bonding and blending materials, particularly along the leading edge of the blades. This situation results in significant repair/maintenance costs and down time for the wind turbine.

Accordingly, the industry would benefit from an improved wind turbine blade construction that reduces the occurrence of premature coating failures, particularly along the leading edge of the turbine blade.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine blade is provided having an upper shell member and a lower shell member joined at leading and trailing edges of the blade with a bond material. Portions of the bond material are externally exposed. The bond material has compressive surface characteristics of at least one of a Shore D hardness value of greater than about 80 durometer or a Young's modulus stiffness value of greater than about 5 GPa, and desirably has both characteristics. At least one protective coating is applied over the upper and lower shell members and leading and trailing edges, including over the externally exposed portions of the bond material.

The bond material may be generically considered as any single material or combination of materials that are suitable for use as a bonding material or filler in the construction of a wind turbine blade having the desired hardness and/or stiffness values. In particular embodiments, the bond material may be any one or combination of filled thermoset resins (such as a filled phenolic or a filled epoxy), a laminate (such as a vinyl ester epoxy laminate, fiberglass laminate, or carbon laminate), an epoxy putty, and so forth.

The protective coating may be gelcoat layer, and further include a paint coating applied over the gelcoat.

In particular embodiments, the bond material having the desired surface characteristics is used only at selected regions of the blade. For example, the bond material may be applied only along a leading edge bond between the upper and lower shell members, or only along the trailing edge bond.

In one embodiment, the leading edge bond includes a bond cap attached to the upper and lower shell members over the leading edge bond. The bond material may be used to adhere the bond cap to the shell members and to define a blended region between the bond cap and the shell members. The bond cap may be formed of a material having a Shore D hardness value of greater than about 80 durometer or a Young's modulus stiffness value of greater than about 5 GPa.

In further embodiments, the bond material is also used as a filler or blending material on either of the upper or lower shell members, for example to smooth out surface irregularities, and underlies the protective coating.

In other aspects, the invention encompasses a wind turbine blade having an external substrate surface defined by an upper shell member, a lower shell member, and exposed regions of a bond material. At least one protective coating is applied over the external substrate surface. The external substrate surface underlying the protective coating has an overall surface characteristic of at least one of a Shore D hardness value of greater than about 80 durometer or a Young's modulus stiffness of greater than about 5 GPa, and desirably both characteristics. In particular embodiments, the bond material has a Shore D hardness and Young's modulus stiffness at least as great as the upper and lower shell members.

The bond material may define portions of the external substrate surface along any combination of a leading edge bond, a trailing edge bond, or external surfaces of the upper and lower shell members. For example, the leading edge bond may include a bond cap, with the bond material defining a blended region at the transition of the bond cap and the upper and lower shell members. The bond cap may also be formed of a material having a Shore D hardness value of greater than about 80 durometer and/or a Young's modulus stiffness value of greater than about 5 GPa.

The invention also encompasses a wind turbine having one or more turbine blades configured with the unique hardened characteristics described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 is a perspective view of a conventional wind turbine;
FIG. 2 is a perspective view of a wind turbine blade;

FIG. 3 is a cross-sectional view of a leading edge bond configuration;

FIG. 4 is an cross-sectional view of a trailing edge bond configuration;

FIG. 5 is a cross-sectional view of a leading edge bond configuration with a bond cap;

FIG. 6 is a graph of the Shore D and modulus (E) values for various materials; and, FIG. 7 is a chart of the values for the materials depicted in the graph of FIG. 6.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 is a more detailed view of a wind turbine blade 16. The blade 16 includes an upper shell member 20 and a lower shell member 22. The upper shell member 20 may be configured as the suction side surface of the blade 16, while the lower shell member 20 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are joined together at a leading edge bond 36 and a trailing edge bond 38. In formation of these bond lines, a bond material 34 (FIGS. 3 and 4) in flowable viscous form is applied between the mating laminate surfaces of the upper shell member 20 and lower shell member 22 along the length of the bond lines 36, 38. The bond material 34 is typically applied in a sufficient quantity and pattern so as to establish a designed bond line width at the leading edge 24 and trailing edge 26 that ensures a minimum bonded surface area between the components along the length of the respective bonds 36, 38.

It should be appreciated that the term "bond material" is used herein in a generic sense to encompass any type of adhesive, resin, filler, blending material, and the like, that may be used in construction of the blade 16, particularly along the bonds 36, 38 between the upper and lower shell members 20, 22, or as a filler or blending material on the surfaces of the shell members 20, 22.

For purposes of the present disclosure, the "hardness" of a material is a measure of the material's resistance to permanent indentation or deformation. The Shore D durometer scale is most commonly used to measure the hardness of harder materials (e.g., steel) (as compared to the Shore A scale used for softer materials, such as rubber). Within the scale, a higher number indicates a harder material. Young's modulus (E) is the ratio of stress to strain, and is measure of a material's stiffness. Young's modulus is given in units of pressure. The hardness or stiffness of a material may be considered as a measure of the compressive characteristics of the material. It is generally recognized that a proportional relationship exists between Young's modulus and Shore D values for materials having a Shore D of greater than about 40.

The present inventors have found that a primary cause of the premature failure of the protective coatings applied to the external substrate surfaces of wind turbine blades in the regions of exposed bond material is the relative softness of the bond material as compared to the shell members. The conventional bond materials typically used in the construction of wind turbine blades (e.g. epoxies, acrylics, polyesters, vinyl esters, and urethanes), when cured, have a Young's modulus of about 1-4 GPa, and a hardness of under about 80 durometer (Shore D). These materials are relatively soft and resilient. The protective coatings of gel coat or paint applied over the external substrate surfaces of the blade, including the exposed surfaces of the bond material, are typically in the thickness range of 25-2000 microns.

In the field, the turbines blades 16 are subjected to impingement from rain, hail, sleet, and snow, particularly along the leading edge of the blade. This impingement on the relatively soft underlying bond material results in excessive deformation of the protective coating layers, particularly the gel coat and paint layers. This excessive deformation eventually results in de-lamination of the coating materials and premature failure of the materials.

FIG. 3 depicts an embodiment of a leading edge bond configuration 36 between an upper shell member 20 and a lower shell member 22. A bond material 34 in accordance with aspects of the invention is applied between the mating surfaces of the shell members 20, 22. The bond material 34 may be any combination of materials, including an adhesive material 35 and a surface blending or filler material 37 (referred to generically herein as a "filler" material), as depicted in FIG. 3. As can be appreciated from FIG. 3, typically some portion of the bond material 34 is "exposed" in that it forms a portion of the external surface 52 of the blade substrate. The external substrate surface 52 may thus be considered as the external surface areas of the blade defined by the external shell member surface 54 and any exposed bond material surfaces 56, as depicted in FIG. 3. As discussed above, one or more protective coating layers 42 are typically applied over the external substrate surface 52, such as an initial gel coat layer 44 and a paint layer 46 applied over the gel coat layer 44.

In alternate embodiments, the component 44 of the protective coating layer 42 may be a tape-like material with layer 46 being a gelcoat or paint layer. Alternately, the tape layer 44 may be used with or without gelcoat, and with or without a paint layer under or over the tape-like layer. For example, a paint layer 46 may be applied over the tape layer 44 without a gelcoat layer, or the layer 46 applied over the tape layer 44 may be gelcoat layer without a paint layer. The tape-like layer may be any suitable conformable material made from any combination of polymeric layers, metallic layers, and ceramic powder layers, such as a frit layer.

The bond material 34 is formulated to have desired compressive characteristics. For example, the bond material 34 is formulated to have a Shore D hardness of greater than about 80 durometer or a Young's modulus stiffness of greater than about 5 GPa. Desirably, the bond material 34 exhibits both of these characteristics. Alternatively, however, a bond material 34 exhibiting either of the hardness or stiffness values may prove suitable.

In general, a "neat" (unfilled) thermoset resin bond material such as epoxy, vinyl ester, phenolic, or polyester will have a Young's modulus of less than 5 GPa and a Shore D hardness of less than 80. If a filler is added to the neat resin in an amount that exceeds about 4% by weight, the Young's modulus will generally exceed 5 GPA and the Shore D hardness will exceed 80 durometer. The modulus and Shore D values are significantly exceeded when the neat resin is combined in a laminate material.

FIG. 6 is a graph of various thermoset resin and laminate materials, with the vertical scale used for Shore D and modulus (E) values. FIG. 7 gives the actual values for the materials depicted in the graph. It can be seen that the neat polyester, vinyl ester, phenolic, and epoxy materials have a relatively low modulus and Shore D value, as well as the 1% filled epoxy and 2% filled phenolic. A 3% filled phenolic approaches the desired characteristics of a Shore D value greater than 80 and a modulus (E) of greater than 5 GPa. The phenolics with a fill level greater than 4% exceed the threshold values. The CFM, Biax, and UD laminates greatly exceed the threshold values. CFM is a Continuous Fiber Mat that uses fiberglass broadgood to create a medium-strength composite material. Biax is two-direction (cross-ply) broadgood that creates a stronger composite laminate. UD is unidirectional fiberglass broadgood used to make a highly-oriented and directionally stronger composite laminate.

Table 1 below identifies non-limiting examples of bond materials having either or both of the desired Shore D and Young's modulus values that may be useful in practice of the present invention (with the exception of the epoxy filler and epoxy putty):

TABLE 1

| Type of Material | Commercial Name | Shore D | Modulus (E) (GPa) |
|---|---|---|---|
| Filled Phenolic (glass fiber) | PF 6771 Bakelite (Hexion Specialty Chemicals) | | 17 |
| Filled Phenolic (glass fiber) | PF 6501 Bakelite | | 15 |
| Filled Phenolic (glass fiber) | PF 1110 Bakelite | | 28 |
| Filled Phenolic (glass fiber) | PF 8412 Bakelite | | 13 |
| Filled Phenolic (glass fiber) | PF 8416 Bakelite | | 15 |
| Filled Phenolic (carbon fiber) | Carbomould M (Hexion Specialty Chemicals) | | 31 |
| Filled Phenolic (carbon fiber) | Carbomould T | | 23 |
| Filled Epoxy | Devcon Putty F (Devcon) | 85 | |
| Filled Epoxy | Ancamine 2505 (Air Products) | 83 | 2.8 |
| Vinyl ester epoxy laminate | Dow Derakane Vinyl Ester 510-40 | | 10.3 |
| Vinyl ester epoxy laminate | Dow Derakane Vinyl Ester 8084 | | 9.8 |
| Fiberglass laminate | Owings Corning SE 1200 | | 77 |
| Carbon laminate | Gurit Sparpreg ™ | | 240 |
| Epoxy filler | MM-80 (Metzger/McGuire) | 55 | |
| Epoxy putty | 1470 Minute Mend Epoxy (CRC) | 65 | |

Referring to FIG. 3, the Young's modulus value is determined for the bond material 34 (whether an adhesive material 35 or filler material 37) in a direction 40 perpendicular to the exposed face of the material. In this regard, the protective coating layers 44, 46 formed over the material 34 do not experience significant deformation or erosion due to the impact of rain, hail, ice, particles, dust, dirt, or any other impinging particulate.

FIG. 4 depicts an embodiment of a trailing edge bond 38 between the upper shell member 20 and lower shell member 22. The bond material 34 is applied between the mating surfaces of the shell members 20, 22 and typically defines an exposed bond material surface 56 at the distal edges of the shell members 20, 22. A protective gel coat layer 44 and paint layer 46 are applied over the shell member surfaces 54 and exposed bond material surface 56. The bond material 34 has the desired compressive characteristics as discussed above.

FIG. 5 depicts an embodiment of a leading edge bond 36 that utilizes a bond cap 48 applied over the external shell member surfaces 54 with a suitable adhesive material 35, as is known in the art. A filler material 37 is used at the transition region between the bond cap 48 and the shell members 20, 22 to define a smooth, blended transition region 50. This filler/adhesive material 37 has the desired compressive characteristics of hardness and/or stiffness as described above. A gel coat layer 44 and paint layer 46 may be applied over the entire leading edge bond region 36 (as well as over the entirety of the external blade surfaces).

Still referring to FIG. 5, in a desirable embodiment, the bond cap 48 is also formed of a material having a Young's modulus stiffness of greater than about 5 GPa and/or a Shore D hardness of greater than about 80 durometer. With this embodiment, the "hardened" bond cap 48 prevents premature de-lamination of the coating layers 44, 46 over the bond cap 48.

It should be appreciated that the invention encompasses various wind turbine blade configurations wherein the "hardened" bond material 34 is used at selective locations on the blade. For example, the hardened bond material 34 may be applied only along a portion of the leading edge bond 36. This portion may be the portion closer to the tip 30 of the blade rather than the root portion 28.

It should also be appreciated that the invention encompasses use of the hardened bond material 34 at any location on the blade wherein a filler or blending material is typically used to smooth out surface irregularities on the blade, or to otherwise provide a smooth aerodynamic surface for the blade.

It should be further appreciated that the invention also encompasses a wind turbine blade configuration 16 wherein the external substrate surface 52 of the blade is defined by the external shell member surfaces 54 and any exposed bond material surfaces 56. At least one protective coating is applied over the external substrate surface 52, such as a gel coat layer 44 and paint layer 46. The external substrate surface 52 underlying any area of the protective coating 42 has an overall compressive surface characteristic of at least one of a Shore D hardness of greater than about 80 durometer or a Young's modulus stiffness of greater than about 5 GPa. Desirably, the external substrate surface has both of the compressive surface characteristics. Thus, in this embodiment, the laminate materials that define the shell member surfaces 54 also have the minimum hardness and stiffness values discussed above. Desirably, the bond material 34 has a hardness and/or stiffness value at least as great as the upper and lower shell member surfaces 54.

The present invention also encompasses any configuration of a wind turbine 10 (FIG. 1) wherein at least one of the blades 16 is configured with the unique advantages of the invention as discussed above.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine blade, said blade comprising:
an upper shell member and a lower shell member;
said upper shell member and said lower shell member joined at leading and trailing edges of said blade with a bond material, wherein span-wise extending portions of said bond material are externally exposed along at least one of said leading or trailing edges between spaced apart and span-wise extending portions of said upper and lower shell members;
said bond material having a Shore D hardness value of greater than about 80 durometer or a Young's modulus stiffness value of greater than about 5 GPa; and,
at least one protective coating applied over said upper and lower shell members, including over said externally exposed portions of said bond material.

2. The wind turbine blade as in claim 1, wherein said bond material comprises any combination of adhesives or filler materials.

3. The wind turbine blade as in claim 2, wherein said bond material comprises any combination of a filled thermoset resin or resin laminate.

4. The wind turbine blade as in claim 1, wherein said protective coating comprises a gelcoat, and further comprising a paint coating over said gelcoat.

5. The wind turbine blade as in claim 1, wherein said leading edge bond further comprises a bond cap, said exposed bond material defining a blended region between said bond cap and said upper and lower shell members.

6. The wind turbine blade as in claim 5, wherein said bond cap is formed of a material having a Shore D hardness value of greater than about 80 durometer or a Young's modulus stiffness value of greater than about 5 GPa.

7. The wind turbine blade as in claim 1, further comprising exposed regions of said bond material used as a filler on either of said upper and lower shell members that underlie said protective coating.

8. A wind turbine blade, said blade comprising:
an external substrate surface defined by an upper shell member, a lower shell member, and exposed regions of a bond material between a spaced apart and span-wise extending portion of said upper and lower shell members;
at least one protective coating applied over said external substrate surface and said exposed region of bond material; and,
said external substrate surface underlying said protective coating having an overall surface characteristic of at least one of a Shore D hardness value of greater than about 80 durometer or a Young's modulus stiffness value of greater than about 5 GPa.

9. The wind turbine blade as in claim 8, wherein said bond material has a Shore D hardness and Young's modulus stiffness value at least as great as said upper and lower shell members.

10. The wind turbine blade as in claim 9, wherein said bond material comprises any combination of a filled thermoset resin or a resin laminate.

11. The wind turbine blade as in claim 8, wherein said protective coating comprises a gelcoat, and further comprising a paint coating over said gelcoat.

12. The wind turbine blade as in claim 8, wherein said bond material is applied along a leading edge bond and a trailing edge bond between said upper and lower shell members.

13. The wind turbine blade as in claim 12, wherein said leading edge bond further comprises a bond cap, said bond material defining a blended region between said bond cap and said upper and lower shell members.

14. The wind turbine blade as in claim 13, wherein said bond cap is formed of a material having a Shore D hardness value of greater than about 80 durometer or a Young's modulus stiffness value of greater than about 5 GPa.

15. The wind turbine blade as in claim 8, wherein said regions of exposed bond material are also used as a filler or blending material on either of said upper and lower shell members underlying said protective coating.

16. The wind turbine blade as in claim 8, wherein said protective coating comprises a gelcoat and a polymeric or metal tape applied over said gelcoat.

17. The wind turbine blade as in claim 8, wherein said protective coating comprises a paint coat and a polymeric or metal tape applied over said paint coat.

18. The wind turbine blade as in claim 8, wherein said protective coating comprises a polymeric or metal tape and either one of a paint coat or gelcoat applied over said tape.

* * * * *